(12) United States Patent
Franke et al.

(10) Patent No.: US 6,591,660 B1
(45) Date of Patent: Jul. 15, 2003

(54) METHOD FOR DETECTING KNOCKING

(75) Inventors: Steffen Franke, Brentwood (GB); Oskar Torno, Schwieberdingen (DE); Axel Heinstein, Wimsheim (DE); Carsten Kluth, Stuttgart (DE); Werner Haeming, Neudenau (DE); Michael Baeuerle, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 09/856,388
(22) PCT Filed: Sep. 26, 2000
(86) PCT No.: PCT/DE00/03339
§ 371 (c)(1),
(2), (4) Date: Jul. 19, 2001
(87) PCT Pub. No.: WO01/23859
PCT Pub. Date: Apr. 5, 2001

(30) Foreign Application Priority Data

Sep. 28, 1999 (DE) .......................... 199 46 346

(51) Int. Cl.$^7$ .............................................. G01L 23/22
(52) U.S. Cl. ................................................ 73/35.03
(58) Field of Search ............................. 73/35.01, 35.03, 73/35.04, 35.05, 35.06

(56) References Cited

U.S. PATENT DOCUMENTS 4,233,836 A * 11/1980 Yoneda et al. ............. 73/35.05
4,387,588 A * 6/1983 Kaji ........................... 73/35.05
4,481,924 A    11/1984 Kobayashi
4,887,456 A * 12/1989 Cockerham et al. ....... 73/35.05

FOREIGN PATENT DOCUMENTS

| DE | 30 16 117 A | 11/1980 |
| DE | 33 13 036 A | 10/1984 |
| DE | 41 32 096 A | 4/1992 |
| DE | 43 32 711 A | 3/1995 |
| DE | 195 49 175 A | 7/1997 |
| EP | 0 529 786 A | 3/1993 |

* cited by examiner

Primary Examiner—Richard A. Moller
(74) Attorney, Agent, or Firm—Michael J. Striker

(57) ABSTRACT

A method for knock detection in an internal combustion engine is disclosed, in which the output signal of at least one knock sensor, which is associated with the engine, is evaluated with the aid of an evaluation device. Knocking is detected when the prepared signal of the knock sensor exceeds a predeterminable reference level. The calculation of the input signal of the reference level tracking takes place as a function of whether the internal combustion engine is in a dynamic operating state or not, wherein in order to calculate the reference level in the event of dynamics, measurement values are also used which were determined when knocking was detected.

5 Claims, 6 Drawing Sheets

METHOD FOR DETECTING KNOCKING

The invention is based on a method for knock detection in an internal combustion engine according to the species defined by claim 1.

PRIOR ART

It is known that internal combustion engines with a knock control use knock sensors, which transmit output signals that permit detection of whether or not a knocking combustion is occurring. For example, body noise sensors are used for knock detection, wherein there are embodiments with a single knock sensor, with two knock sensors which are attached to predeterminable locations on the engine block, or with a knock sensor for each cylinder. The problem in evaluating the signals from the knock sensors lies in that the signal produced by the knocking must be separated from the signals produced by other noise. Since both the knock signal and the background signal depend on various operating conditions of the internal combustion engine, carrying out the knock evaluation as a function of the speed of the engine is already known.

In a device for knock detection known from DE-P 43 32 711, there is a description as to how the output signals of two knock sensors are processed for knock detection. In a microprocessor, prior knock signals are used to generate reference levels, which are compared to the current output signal which corresponds to a prepared knock sensor signal. If the signal exceeds the reference level, then knocking is detected and a corresponding control, e.g. of the ignition, is carried out, which assures that no further knocking occurs in the subsequent combustions. In order for the speed dependency of the background signal and the knock signal is taken into consideration and an optimal knock detection can be executed, the reference level is changed as a function of the speed, wherein as the speed increases, the reference level is increased as well.

ADVANTAGES OF THE INVENTION

The method for knock detection according to the invention, with the characteristics of claim 1, has the advantage that a reliable knock detection is possible over the entire working range of the engine, independent of the intensity of the noise. This advantage is achieved by virtue of the fact that in addition to the usual reference level tracking, an improved reference level tracking is carried out in the event of dynamics, particularly for internal combustion engines that have a sharp noise increase. Even in engines with above average noise production or in ranges with an above average noise increase, a false detection of knocking does not occur since in this case as well, a reference level adaptation advantageously occurs.

Further advantages of the invention are achieved by means of the steps taken in the dependent claims. In this connection, it is particularly advantageous that the improved reference level tracking in the event of dynamics permits a quicker tracking of the reference level. This rapid tracking is achieved by virtue of the fact that the associated factor in the dynamic case is reduced in comparison to the normal case.

DRAWINGS

The invention is shown in the drawings and will be explained in detail in the subsequent description.

DESCRIPTION

Figure 1:
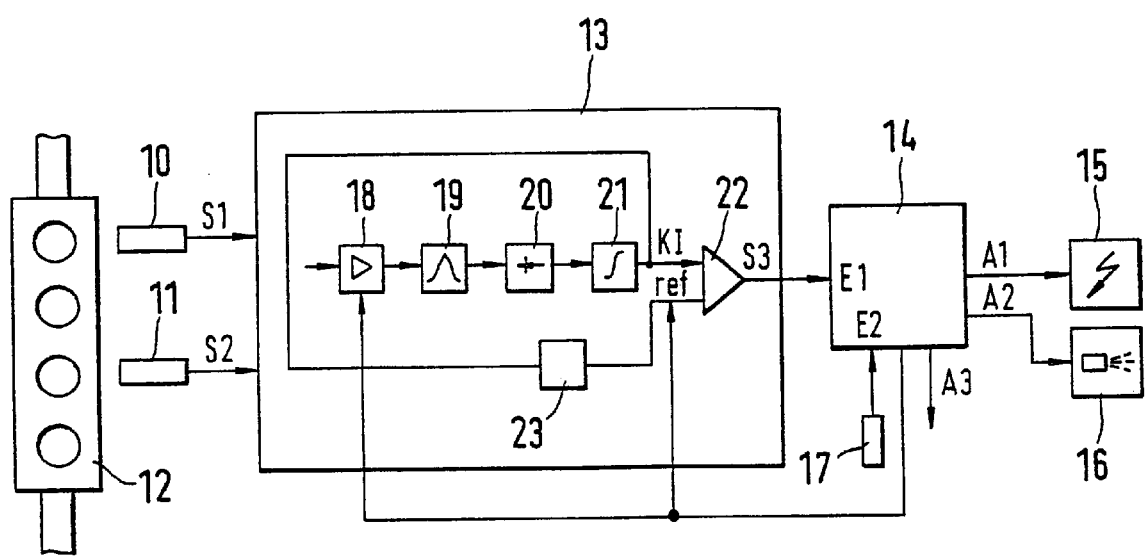
FIG. 1 shows a possible embodiment of a device for knock detection with which the method for knock detection according to the invention can be carried out.

In the embodiment of a device shown in FIG. 1 for knock detection in an internal combustion engine, two knock sensors 10, 11, for example body noise sensors, are disposed at predeterminable locations on the engine block 12 of the internal combustion engine. The knock sensors 10, 11 emit signals S1, S2, which depend on engine noise as well as possibly existing interference noise and knocking noise. In order to carry out reliable knock detection, the signal components must be separated. To that end, the signals S1 and S2 of the knock sensors 10, 11 are suitably processed in the evaluation device 13 and a signal S3 is produced at the output of the evaluation unit 13 and permits the detection of knocking or the absence thereof.

The evaluation device 13 can be designed as a discrete circuit or as a component of a microcomputer. For example, the evaluation circuit 13 is integrated into the control unit of the internal combustion engine. A microcomputer 14, which processes the signal S3 of the evaluation device 13, is for example a microprocessor of the control unit. As a function of the signal S3 which permits knocking to be detected, the microcomputer 14 controls ignition devices 15 and/or injection devices 16 and thereby controls the combustion process in the individual cylinders of the internal combustion engine.

For optimal control of the internal combustion engine, the microprocessor 14 is supplied with additional signals which are supplied, for example, by a sensor 17, for example a throttle valve sensor. It is naturally possible for there to be an arbitrarily large amount of sensors whose output signals are supplied to the microcomputer after a corresponding preparation and are processed by this microcomputer. In the exemplary embodiment according FIG. 1, the signals are supplied respectively via inputs, which are labeled E1 and E2; the outputs are represented by the outputs A1, A2, and A3.

The actual knock detection takes place in the evaluation device 13. In the exemplary embodiment selected, the evaluation device 13 includes at least one amplifier 18 with an adjustable amplification factor, which receives the output signals S1 and S2 supplied by the knock sensors 10 and 11. In this connection, the signal supplied is the respective output signal of the cylinder, which is associated with the currently combusting cylinder by means of software. In a subsequent band-pass filter 19, the amplified signals are filtered so that priority is given to the signal components with frequencies typical of knocking. The band-pass filter is connected to a demodulation circuit 28, for example a rectifier. The signals emitted by the demodulation circuit 20 are integrated in the integrator 21 and the integrated signals KI are applied to a first input of the comparator 22.

The other input of the comparator 22 is with a reference signal or a reference level Ref which is produced, for example through the use of a low-pass filter 23, by averaging knock sensor signals that are prepared in a predeterminable manner. The manner in which the actual values of the reference level are generated and which values they assume is the essence of the invention and will be described in further detail below.

The precise design of the individual elements of the evaluation device 13 is not essential for the comprehension of the invention and therefore is not discussed in detail. The evaluation device 13 can also be embodied completely as a digital evaluation device, for example as a microprocessor.

With the aid of the device shown in FIG. 1, the knock detection takes place as follows: The knock sensors 10, 11 record noise produced by the internal combustion engine and send corresponding signals S1 and S2 to the evaluation device 13. These signals are suitably filtered and amplified. The comparison of the integrated knock signals KI with the reference level Ref produces the signal S3 which permits detection as to whether knocking has occurred.

Figure 2:
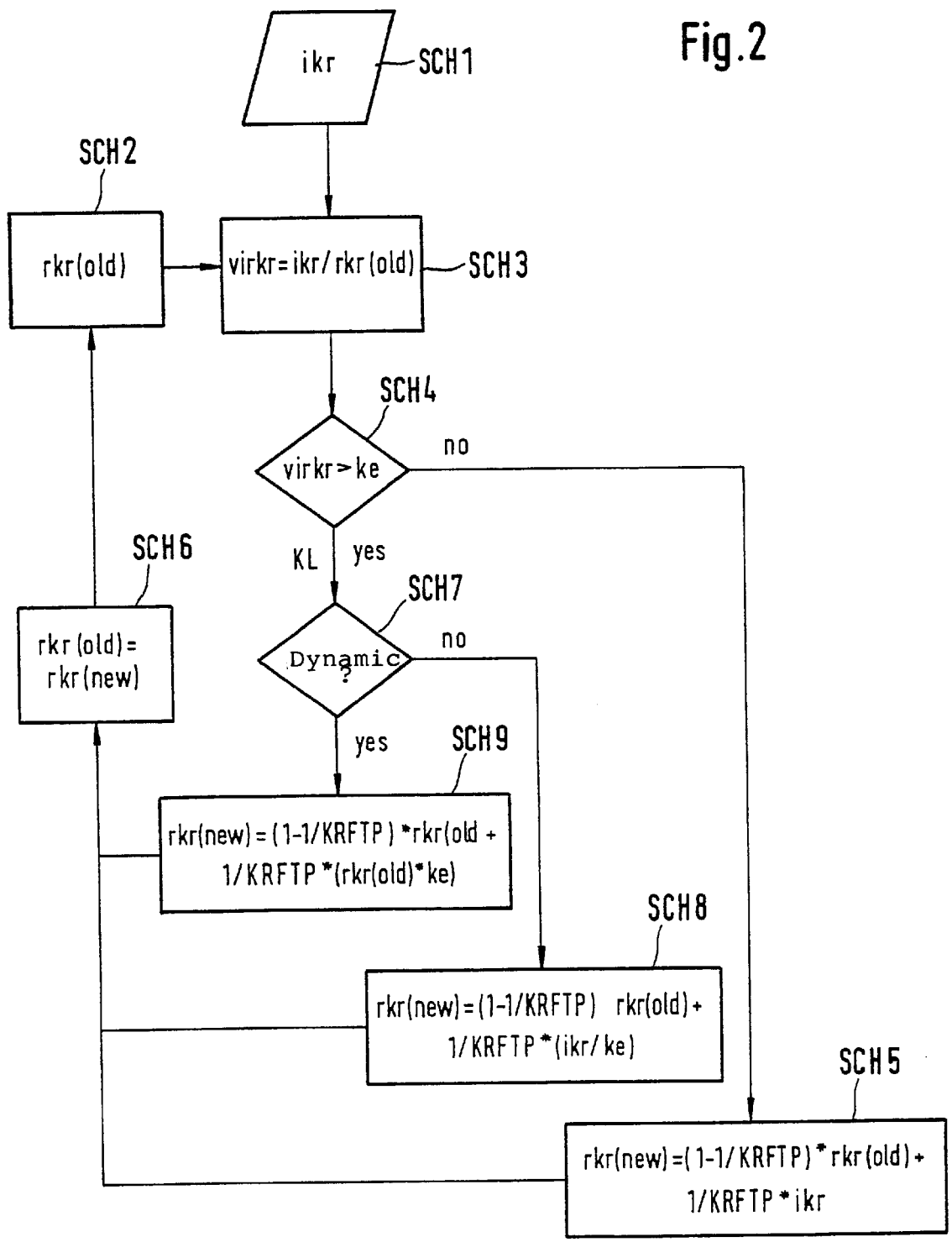
FIGS. 2 and 3 show two knock detection methods according to the invention, in the form of flowcharts, and FIGS. 4a, b, and c show different reverence level curves.

The precise kind of procedure with which knock detection occurs in internal combustion engines that have knock sensors which function as body noise sensors can be explained, for example, with the aid of the flowchart shown in FIG. 2. In this exemplary embodiment, in a first step SCH1, the noise ikr of the current combustion is detected. Based on the noise ikr, in a step SCH3, the proportion virkr of the noise ikr of the current combustion and the noise averaged over several combustions of the same cylinder yields the so-called reference level rkr, wherein the reference level rkr(old) has been previously entered in step SCH2.

The proportion virkr calculated in step SCH3 is tested in step SCH4 as to whether it is greater than the knock detection threshold ke. If the proportion virkr=ikr/rkr(old) is greater than the knock detection threshold ke, then knocking is detected and a signal KL is emitted. It is also the case that when ikr is greater than rkr(old)*ke, knocking is detected and a corresponding signal KL is emitted.

If it is ascertained in step SCH4 that vikr is not greater than ke, the calculation of the reference level rkr(old) in knock free operation thus takes place recursively in SCH5, according to the formula:

$$rkr(\text{new})=(1-1/KRFTP)*rkr(\text{old})+1/KRFTP*ikr.$$

The quantity KRFTP is referred to as a so-called tracking factor. The tracking factor can be suitably adapted in a manner specific to internal combustion engines.

The new reference level rkr(new) thus produced represents the ground noise of the internal combustion engine without knocking. With the next pass through the program, the reference level rkr(new) calculated in step SCH5 is considered in step SCH6 to be reference level rkr(old) and is used for the next calculation of the proportion virkr.

If in step SCH4, a combustion is detected as knocking, the noise ikr measured for this combustion is not completely included in the reference level rkr. How the inclusion occurs in the event of knocking depends on whether or not dynamics are present. To this end, in step SCH7, a check is made as to whether the internal combustion is in a dynamic operating state. For the detection of dynamics, a check can be carried out, for example, as to whether the speed is changing significantly.

If there is not a dynamic situation, the inclusion of the measured noise ikr takes place by virtue of the fact that it is divided by the factor ke in order to prevent an increase in the reference level rkr as a result of the knocking noise. In this case, the new value for the reference level rkr(new) is calculated in step SCH8 according to the formula:

$$rkr(\text{new})=(1-1/KRFTP)*rkr(\text{old})+1/KRFTP*(ikr/ke).$$

In principle, the inclusion of knocking combustions cannot be prevented because in the event of dynamics, their noise also contains the natural noise increase of the internal combustion engine and must correspondingly be detected along with it.

So that a rapid and sharp increase in the ground noise in the event of dynamics (step SCH7 depicts the presence of dynamics) does not cause erroneous detections, i.e. so that suddenly louder combustions are not incorrectly detected as knocking, two measures are taken for the duration of the dynamics: the reference level tracking is accelerated through the choice of a smaller factor KRFTP and the knock detection threshold is increased.

Despite these countermeasures against erroneous knock detection, erroneous detections can in fact occur in internal combustion engines or motors with above average noise increase, for example as a result of piston canting. However, due to the above-described weighting of the noise of the current combustion ikr with the factor ke with inclusion into the reference level rkr, a combustion incorrectly detected as knocking leads to an improper delay in the tracking of the calculated ground noise rkr. This discrepancy between the actual and calculated ground noise can result in further erroneous detections. Since each knock detection finally produces an ignition angle shift toward the late end of the spectrum, erroneously detected knocking can lead to a corresponding loss in performance and efficiency, which are totally unnecessary in the case of erroneous detections. According to the invention, the previously described calculation of the reference level, which takes place in the event that dynamics are detected in step SCH7, is thus carried out according to a different method, as a result of which erroneous detections are reduced and at the same time, a detection of actual knocking is still assured.

Depending on whether dynamics are currently present or not, the new reference level value is executed either according to the formula indicated in step SCH8 or according to the formula indicated in step SCH9. In step SCH6, the old value of the reference level rkr(old) is then respectively replaced by the new value rkr(new) and this is used once again in step SCH3 to generate the proportion.

When knocking is detected, if there is actual knocking or an erroneous detection, the described method thus produces a calculation for the reference level rkr(new) in the event of dynamics, according to a modified formula:

$$rkr(\text{new})=(1-1/KRFTP)*rkr(\text{old})+1/KRFTP*(rkr(\text{old})*ke.$$

In this connection, the quantity rkr(old)*ke corresponds to precisely the noise level that would not yet be detected as knocking. That is, in contrast to a method in which no distinction is drawn between the dynamic and non-dynamic, a greater value is included for the reference level tracking, but is defined based on the average noise level. This method for reference level determination prevents erroneous knock detections and therefore losses in performance and efficiency.

Figure 3:
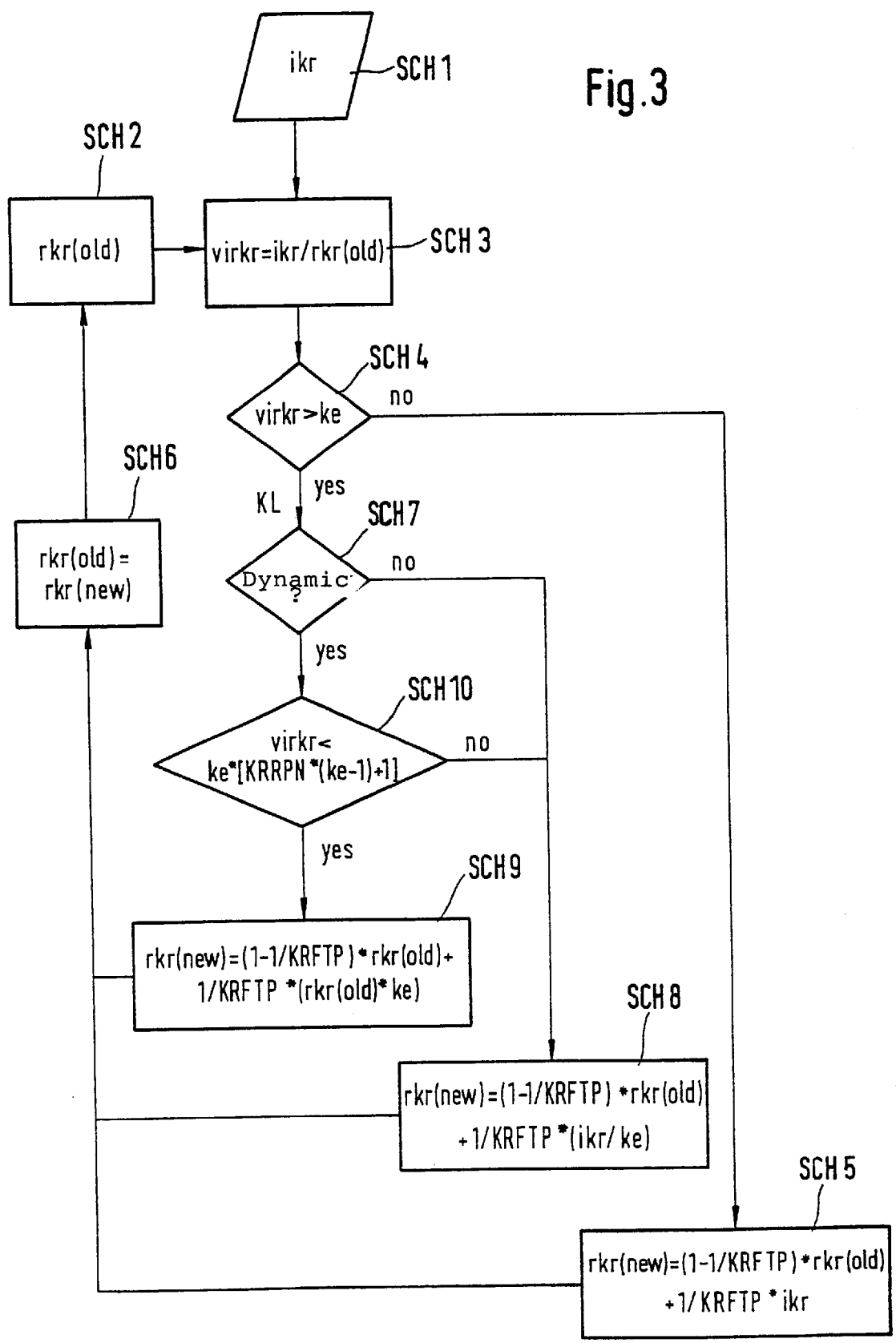

FIG. 3 shows another exemplary embodiment of the invention, which takes into consideration a reference level tracking in the event of dynamics. This method differs from the one shown in FIG. 2 merely by means of the additional step SCH10, which includes an additional threshold value query. If knocking is detected in step SCH4 and dynamics are detected in step SCH7 (either actually occurring knocking or erroneous detections), then step SCH10 is subsequently executed. In this case, the value virkr is compared to a threshold ke*(KRRPN*(ke−1)+1), wherein the factor KRRPN can assume a value range (0, 1), which lies between ke and $ke^2$. If this threshold is not exceeded, the reference level is calculated using the formula indicated in step SCH9:

$$rkr(\text{new})=(1-1/KRFTP)*rkr(\text{old})+1/KRFTP*(rkr(\text{old})*ke).$$

However, if this threshold value is also exceeded by the proportion virkr, then the new reference value is calculated using the formula indicated in step SCH8; this formula corresponds to the formula used previously when knocking was detected. This formula reads as follows:

$$rkr(\text{new})=(1-1/KRFTP)*rkr(\text{old})+1/KRFTP*(ikr/ke).$$

By including this additional variable threshold, when KRRPN =0, the previous proportion of the reference level tracking can be produced; but when KRRPN=1, a maximally rapid reference level tracking is achieved which is desirable in internal combustion engines or motors with rapid noise increase in the event of speed dynamics. As a result, the probability of erroneous detections in the event of dynamics is reduced over a longer period of time and attendant losses in performance and efficiency are therefore reduced.

Figure 4A:
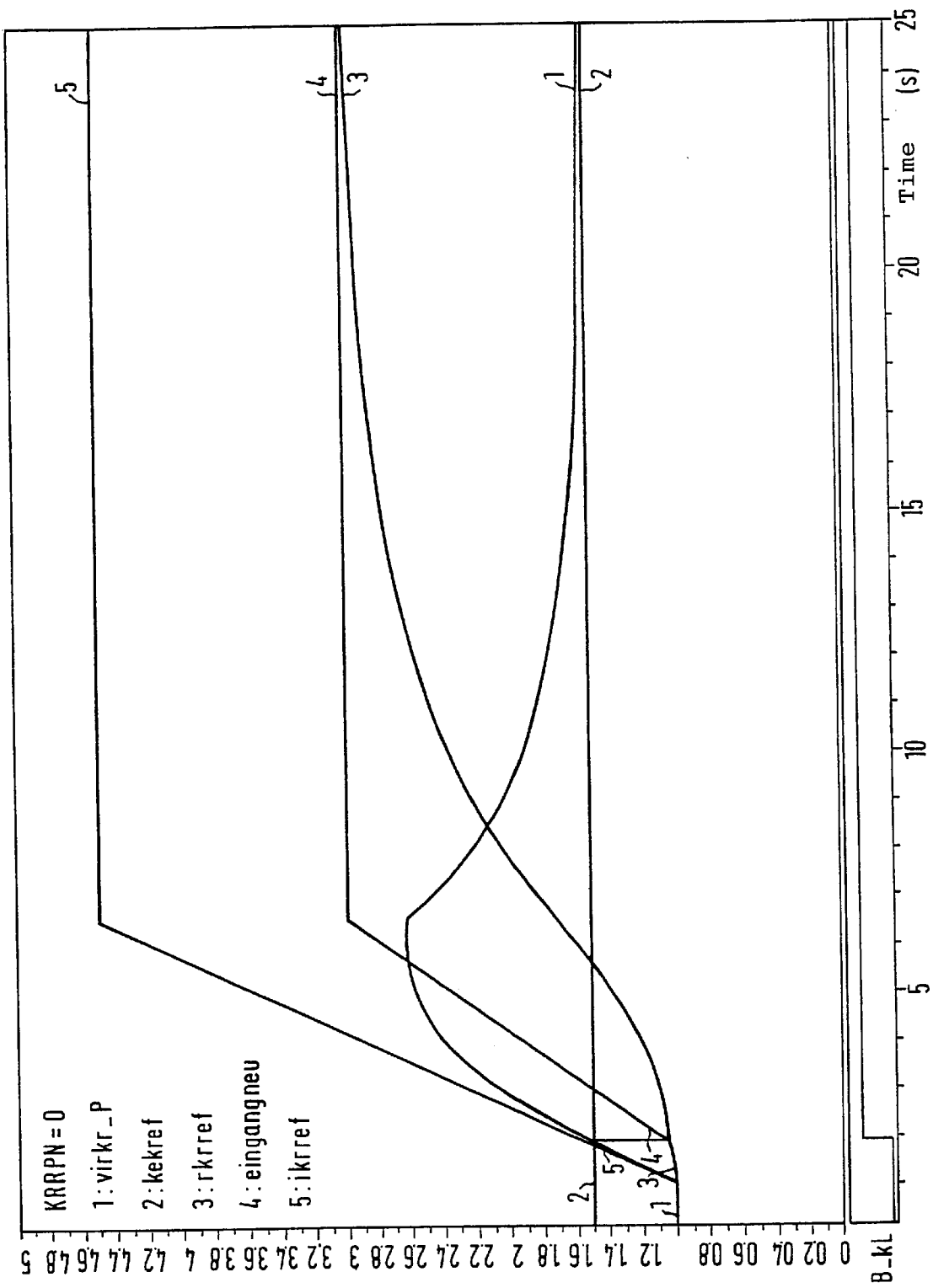
Figure 4B:
Figure 4C:
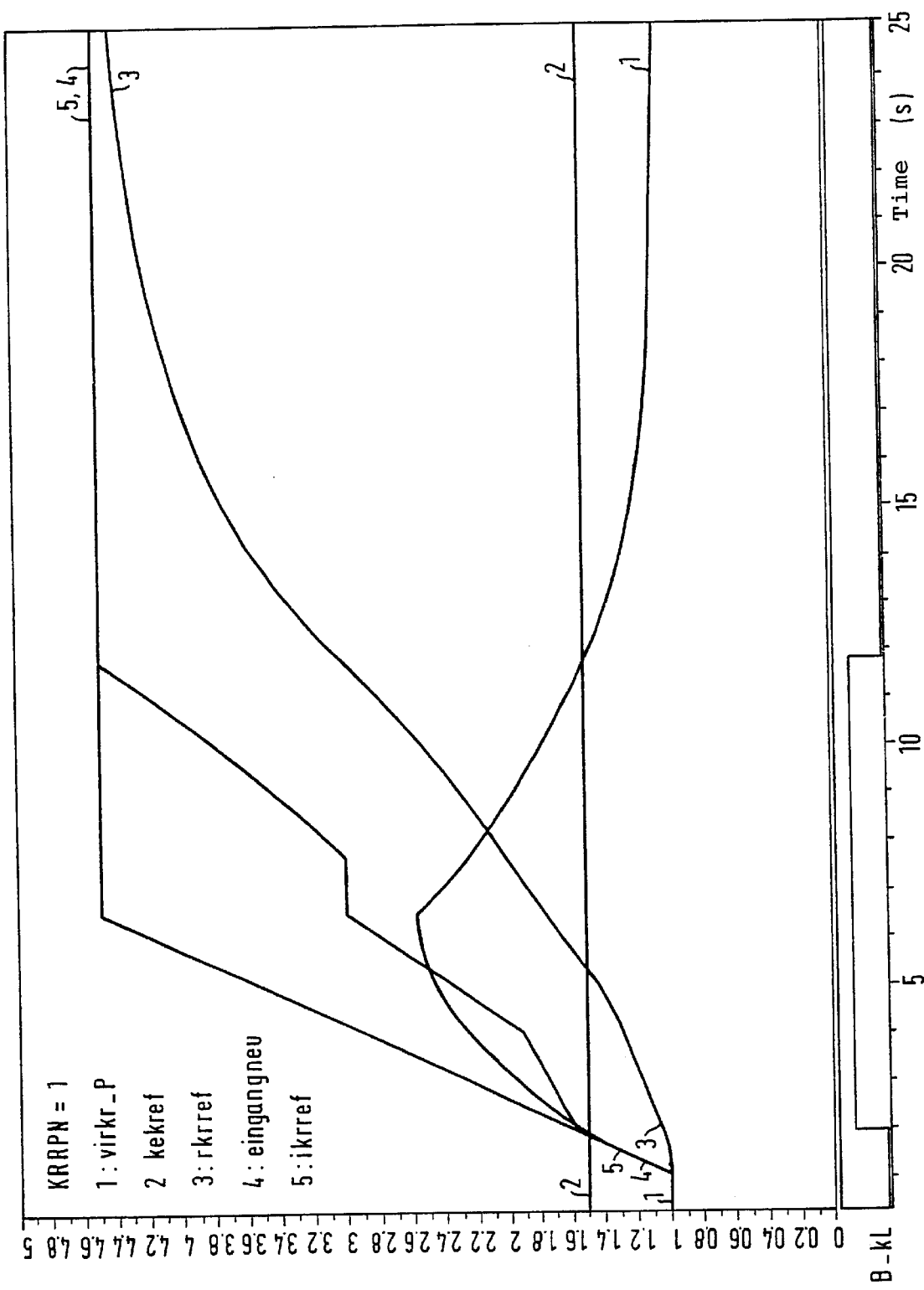

Examples for the curve of values, which are determined by means of simulation, are plotted in FIG. 4 virkr_P: proportion of the noise ikr of the current combustion and the average noise of the most recent combustion of the same cylinder, kekref: knock detection threshold rkrref: reference level=sliding average for most recent combustions eingangneu: value which is used to calculate the current reference level, and ikrref: noise of the current combustion wherein for the factor KRRPN, a value of 0 (FIG. 4a), 0.5 (FIG. 4b), and 1.0 (FIG. 4c) were selected. "B_kl" indicates whether knocking has been detected (high level) or not (low level).

What is claimed is:

1. A method for knock detection in an internal combustion engine, having at least one knock sensor and an evaluation device connected to said at least one knock sensor, wherein said evaluation device includes at least one comparison means which compares an output signal of the knock sensor to a variable reference level, wherein said variable reference level is produced as a function of preceding output signals of the knock sensor, wherein the variable reference level is supplied to the comparison means via a low-pass filter and the comparison means detects knocking depending on a comparison result, characterized in that tracking of the reference level takes place according to at least two different methods, wherein one of said at least two different methods is selected depending on whether dynamics are detected or not.

2. The method for knock detection according to claim 1, characterized in that the reference value rkr(new) is produced according to one of the equations:

1: $rkr(\text{new})=(1-1/KRFTP)*rkr(\text{old})+1/KRFTP*ikr,$

2: $rkr(\text{new})=(1-1/KRFTP)*rkr(\text{old})+1/KRFTP*(ikr/ke),$ or

3: $rkr(\text{new})=(1-1/KRFTP)*rkr(\text{old})+1/KRFTP*(rkr(\text{old})*(ke)),$ wherein rkr(old) is the previous reference value, KRFTP is the tracking factor, ikr is the noise of the current combustion, and ke is a factor, and wherein a selection of one of said equations is based on an occurrence or non-occurrence of at least one event selected from the group consisting of knocking of the Internal combustion engine and dynamics of the Internal combustion engine.

3. The method for knock detection according to claim 2, characterized in that knocking is detected when the proportion virkr, which is produced from the current knock value ikr and preceding reference level rkr(old), exceeds a predeterminable value ke.

4. The method for knock detection according to claim 1, characterized in that output signals of the knock sensor, which were determined when knocking was detected, are also taken into account in the determination of a new reference value.

5. The method for knock detection according to claim 1, characterized in that with production of a reference level rkr, consideration is also given as to whether a proportion virkr is greater than a threshold value ke*(KRRPN*(ke-1)+1), wherein ke is a knock detection threshold and KRRPN is a factor with a value between 0 and 1.

* * * * *